US009959395B2

United States Patent
Pathak et al.

(10) Patent No.: US 9,959,395 B2
(45) Date of Patent: May 1, 2018

(54) HYBRID DIGITAL RIGHTS MANAGEMENT SYSTEM AND RELATED DOCUMENT ACCESS AUTHORIZATION METHOD

(71) Applicant: KONICA MINOLTA LABORATORY U.S.A., INC., San Mateo, CA (US)

(72) Inventors: Rabindra Pathak, San Jose, CA (US); Kyohei Shiraishi, San Mateo, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 171 days.

(21) Appl. No.: 14/788,419

(22) Filed: Jun. 30, 2015

(65) Prior Publication Data
US 2017/0004291 A1    Jan. 5, 2017

(51) Int. Cl.
*G06F 21/10* (2013.01)
*G06F 21/62* (2013.01)

(52) U.S. Cl.
CPC ...... *G06F 21/10* (2013.01); *G06F 2221/0728* (2013.01)

(58) Field of Classification Search
CPC .............. G06F 21/105; G06F 21/6218; G06F 2221/0728
See application file for complete search history.

(56) References Cited

U.S. PATENT DOCUMENTS

| | | |
|---|---|---|
| 6,954,839 B2 | 10/2005 | Idei et al. |
| 7,698,223 B2 | 4/2010 | Padawer et al. |
| 9,106,621 B2 | 8/2015 | Taima |
| 9,356,936 B2 | 5/2016 | Negrea et al. |
| 2003/0115144 A1 | 6/2003 | Stefik et al. |
| 2003/0200466 A1 | 10/2003 | Nelson et al. |
| 2006/0242073 A1 | 10/2006 | Padawer et al. |

(Continued)

OTHER PUBLICATIONS

Adobe Systems Incorporated, "Adobe LiveCycle ES3 Overview: Rights Management", http://help.adobe.com/en_US/livecycle/10.0/Overview/WS92d06802c76abadb2c8525912ddcb9aad9-7ff8.html, 7 pages, printed from the internet on Apr. 15, 2014.

(Continued)

*Primary Examiner* — Mary Li
(74) *Attorney, Agent, or Firm* — Chen Yoshimura LLP

(57) ABSTRACT

A digital rights management system includes two digital rights management servers (RMS servers) connected to a client computer. The two RMS servers implement different but related digital rights management (DRM) policies, with the first RMS server implementing conventional DRM policies and the second RMS server implementing extended DRM policies. An application program on the client computer interacts with a document on the client computer, and communicates with the first RMS server to obtain access authorization for the document. A plug-in program in the client computer cooperates with the application program, and communicates with the second RMS server to obtain additional access authorization for the document. Access to the document is granted when both RMS servers grant access to the document. This achieves extended digital rights management control which can provide a more flexible access control than that provided by existing DRM systems.

14 Claims, 6 Drawing Sheets

(56) References Cited

U.S. PATENT DOCUMENTS

| | | | | |
|---|---|---|---|---|
| 2007/0100765 | A1* | 5/2007 | Naganuma | G06Q 10/06 705/59 |
| 2008/0059474 | A1* | 3/2008 | Lim | G06F 17/3089 |
| 2009/0327705 | A1* | 12/2009 | Ray | G06F 21/10 713/156 |
| 2010/0043077 | A1* | 2/2010 | Robert | G06F 21/10 726/27 |
| 2010/0149570 | A1* | 6/2010 | Kamiya | G06F 21/10 358/1.13 |
| 2010/0180347 | A1 | 7/2010 | Vargza et al. | |
| 2014/0282842 | A1 | 9/2014 | Pathak | |
| 2016/0259947 | A1* | 9/2016 | Negrea | G06F 21/10 |

OTHER PUBLICATIONS

Adobe Systems Incorporated, "Programmatically applying policies", http://help.adobe.com/en_US/livecycle/10.0/Overview/WSb96e41f8a4ca47a9-4882aeb5131190eddba-8000.html, 1 page, printed from the internet on Apr. 9, 2014.

Adobe Systems Incorporated, "LiveCycle® ES Java™ API Reference", http://livedocs.adobe.com/livecycle/es/sdkHelp/programmer/javadoc/index.html, 3 pages, printed from the internet on Apr. 9, 2014.

Microsoft, "Active Directory Rights Management Services", http://technet.microsoft.com/en-us/windowsserver/dd448611.aspx, 2 pages, printed from the internet on Nov. 10, 2014.

Microsoft, "AD RMS Overview", http://msdn.microsoft.com/library/cc530389(VS.85).aspx, 6 pages, printed from the internet on Nov. 10, 2014.

Microsoft, "Using the AD RMS SDK", http://msdn.microsoft.com/en-us/library/cc542552(v=vs.85).aspx, 1 page, printed from the internet on Nov. 10, 2014.

Microsoft, "AD RMS Documentation Roadmap", http://technet.microsoft.com/en-us/library/dd772711.aspx, 3 pages, printed from the internet on Nov. 10, 2014.

* cited by examiner

33 RMS Server Information Table

| RMSRefId | PolicySchema | Binding | SupportedFiles | Status |
|---|---|---|---|---|
| xxxxxxxx-xxxx...-xxxxxxR0 | URL1 | 0xAAAA.... | .PDF | TRUE |
| xxxxxxxx-xxxx...-xxxxxxR1 | URL2 | 0x8888.... | .DOCX, .XLSX, ... | TRUE |
| …….. | …….. | …….. | …….. | …….. |

Fig. 5

34 Policy Table

| PolicyRefId | Policy | Status |
|---|---|---|
| xxxxxxxx-xxxx-xxxx-xxxx-xxxxxxP0 | 0xABCD.... | TRUE |
| xxxxxxxx-xxxx-xxxx-xxxx-xxxxxxP1 | 0xEFGH.... | FALSE |
| …….. | ………. | …….. |

Fig. 6

35 Policy Mapping Table

| Id | PolicyRefId | RemotePolicyRefId | RMSRefId |
|---|---|---|---|
| xxxxxxxx-...-ABCD | xxxxxxxx-....xxP0 | xxxxxxxx-....xxA0 | xxxxxxxx-....xxR0 |
| xxxxxxxx-...-EFGH | xxxxxxxx-....xxP1 | xxxxxxxx-....xxA1 | xxxxxxxx-....xxR0 |
| …….. | xxxxxxxx-....xxP0 | xxxxxxxx-....xxM0 | xxxxxxxx-....xxR1 |
| …….. | xxxxxxxx-....xxP1 | xxxxxxxx-....xxM1 | xxxxxxxx-....xxR1 |
| …….. | …….. | …….. | …….. |

Fig. 7

36 Domain Authentication Provider Table

| DomainId | Name | Binding |
|---|---|---|
| 0 | Adobe AEM | 0xAAAA.... |
| 1 | Azure RMS | 0xBBBB.... |
| 2 | …….. | …….. |
| …. | …….. | …….. |

Fig. 9

37 Shallow User Table

| Id | UserId | DomainId | Status |
|---|---|---|---|
| xxxxxxxx-xxxx-xxxx-xxxx-xxxxxxx0 | user_a@xxx.com | 0 | TRUE |
| xxxxxxxx-xxxx-xxxx-xxxx-xxxxxxx1 | user_b@yyy.com | 1 | TRUE |
| …. | …. | …. | …. |

Fig. 10

HYBRID DIGITAL RIGHTS MANAGEMENT SYSTEM AND RELATED DOCUMENT ACCESS AUTHORIZATION METHOD

BACKGROUND OF THE INVENTION

Field of the Invention

This invention relates to digital rights management (DRM) for digital documents, and in particular, it relates to a hybrid DRM system that combines different types of digital rights management systems, and document access authorization and document protection methods implemented in such a system.

Description of Related Art

Documents traditionally available only in hard copies are increasingly also available in digital copies. In fact many documents nowadays are prepared, generated, stored, distributed, accessed, read or otherwise used electronically in digital file formats such as the Portable Document Format (PDF), Word, PowerPoint, Excel, etc. With the wide use of digital documents and digital document processing, digital rights management systems ("DRM" or "RMS") are increasingly implemented to control user access and prevent unauthorized use of digital documents. The rights involved in using a digital document may include the right to view (or "read") the digital document, the right to edit (or "write") the digital document, the right to print the digital document in hard copies, the right to copy the digital document, etc. A user may access a digital document by acquiring (or being assigned) one or more of these rights.

DRM systems are generally implemented for managing users' rights to the digital documents stored in the systems. In a current DRM system, each digital document is associated with a rights management policy (or simply referred to as policy in this disclosure) that specifies which user has what rights to the document, as well as other parameters relating to access rights. Many such policies are stored in a DRM server (also called RMS server). The server stores a database table that associates each document (e.g. by a unique ID, referred to as document ID or license ID) with a policy (e.g. by policy ID). Each digital document may also have metadata that contains the document ID. When a user attempts to access a document (either a document residing on a server or a document that has been downloaded or copied to the user's computer) using an application program such as Adobe™ Reader, the application program contacts the DRM server to request permission. The DRM server determines whether the requesting user has the right to access the document in the attempted manner (view, edit, print, etc.), by determining the policy associated with the document and then referring to the content of that policy. The DRM server then transmits an appropriate reply to the application program to grant or deny the access. If access is granted, the server's reply may contain a decryption key to decrypt the document.

Two existing types of DRM systems are Adobe™ LiveCycle™ and Microsoft™ Active Directory™ Rights Management. Adobe LiveCycle supports a broader range of devices and operating systems which can utilize DRM protected PDF documents compared to other vendors. Microsoft Active Directory supports a broader range of devices and operating systems which can utilize DRM protected Microsoft Office (Word, PowerPoint and Excel) documents compared to other vendors.

SUMMARY

The present invention is directed to a hybrid DRM system and related methods that can support both Adobe LiveCycle and Microsoft Active Directory types of DRM systems.

An object of the present invention is to provide a hybrid DRM system with shared infrastructure such as user database, policy database and document storage so that it can be seamlessly shared and utilized by multiple different types of DRM systems such as Adobe LiveCycle and Microsoft Active Directory.

Another object of the present invention is to provide a hybrid DRM system that delivers a transparent user experience so that the end user will feel that he is working with one DRM system, although the user requests may actually be processed by multiple different DRM systems such as Adobe LiveCycle and Microsoft Active Directory.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a digital rights management method implemented in a system including a first digital rights management server (first RMS server), a second digital rights management server (second RMS server), and a client computer connected to the first RMS server and the second RMS server, the client computer including an application program for interacting with a document which is requested to be accessed by a user and a plug-in program which cooperates with the application program, the method including: (a) the application program communicating with the first RMS server to obtain a first authorization response which indicates whether the first RMS server grants or denies access to the document by the user under a first digital rights management policy (first DRM policy) stored on the first RMS server; (b) the plug-in program communicating with the second RMS server to obtain a second authorization response which indicates whether the second RMS server grants or denies access to the document by the user under a second digital rights management policy (second DRM policy) stored on the second RMS server, wherein the second DRM policy contains additional policy terms not contained in the first DRM policy; and (c) the plug-in program and the application program cooperating with each other to grant or deny access to the document by the user based on the first authorization response and the second authorization response.

Preferably, in step (a), if the first authorization response indicates that the first RMS server grants access to the document, the first authorization response further includes a decryption key for decrypting the document; the second authorization response includes no decryption key regardless of whether the second RMS server grants or denies access to the document.

In some embodiments, the second RMS server is a Microsoft Active Directory RMS server and the application program is a Microsoft Office program.

In step (c), the plug-in program and the application program grant access to the document by the user only if the first authorization response indicates that the first RMS server grants access to the document by the user and the second authorization response indicate that the second RMS server grants access to the document by the user.

In another aspect, the present invention provides a computer program product comprising a computer usable non-transitory medium having a computer readable program code embedded therein for controlling a client computer, the computer readable program code being a plug-in program code configured to cooperate with an application program of the client computer to cause the client computer to execute a digital rights management process, the process including: obtaining a document ID for a document to be accessed and a user ID for a user requesting access to the document from the application program; transmitting an authentication request to a digital rights management server (RMS server), the authentication request including the document ID and the user ID; receiving an authorization response from the RMS server which indicates whether the RMS server grants or denies access to the document by the user, the authorization response containing no decryption key for decrypting the document; and either passing the authorization response to the application program, or closing the document that has been opened by the application program if the authentication response indicates that the RMS server denies access to the document by the user.

In another aspect, the present invention provides a computer program product comprising a computer usable non-transitory medium having a computer readable program code embedded therein for controlling a digital rights management server (RMS server), the computer readable program code configured to cause the RMS server to execute a digital rights management process, the process including: storing a document authorization table, the document authorization table containing a plurality of document IDs and a DRM policy associated with each document ID including full policy information regarding which users have what access rights to a document represented by the document ID; receiving an authorization request from a client computer, and extracting from the authorization request a document ID of a document requested to be accessed and a user ID of a user requesting access; querying the document authorization table using the document ID to obtain the full policy information associated with the document ID, and based on the full policy information, determining whether the user is to be granted or denied access to the document; and transmitting an authorization response to indicate whether the user is granted or denied access to the document, wherein the authorization response contains no decryption key for decrypting the document.

It is to be understood that both the foregoing general description and the following detailed description are exemplary and explanatory and are intended to provide further explanation of the invention as claimed.

BRIEF DESCRIPTION OF THE DRAWINGS

FIG. 5 schematically illustrates an RMS server table stored in a DRM database in the hybrid RMS server of the embodiment of FIG. 1 and used in the method of FIG. 4.

FIG. 6 schematically illustrates a policy table stored in a DRM database in the hybrid RMS server of the embodiment of FIG. 1 and used in the method of FIG. 4.

FIG. 7 schematically illustrates a policy mapping table stored in a DRM database in the hybrid RMS server of the embodiment of FIG. 1 and used in the method of FIG. 4.

FIG. 9 schematically illustrates a domain authentication provider table stored in a DRM database in the hybrid RMS server of the embodiment of FIG. 1 and used in the method of FIG. 8.

FIG. 10 schematically illustrates a shallow user table stored in a DRM database in the hybrid RMS server of the embodiment of FIG. 1 and used in the method of FIG. 8.

DETAILED DESCRIPTION OF PREFERRED EMBODIMENTS

The description herein of the structures, functions, interfaces and other relevant features, such as digital rights policies, application programming interface (API) for rights management and policies, etc., of existing DRM systems may at times incorporates, references or otherwise uses certain information, documents and materials from publicly and readily available and accessible public information, e.g., "Rights Management" (URL http://help.adobe.com/en_US/livecycle/10.0/Overview/WS92d06802c76abadb2c852-5912ddcb9a ad9-7ff8.html), "Programmatically applying policies (a subsection of 'Rights Management')", (URL http://help.adobe.com/en_US/livecycle/10.0/Overview/WSb96e41f8a4ca47a9-4882aeb5131190eddba-8000.html), "LiveCycle® ES Java™ API Reference" (URL http://livedocs.adobe.com/livecycle/es/sdkHelp/programmer/javadoc/index.html), etc. Another example of digital rights management system is Microsoft Active Directory Rights Management; some documentations for this system are available on line at: http://technet.microsoft.com/en-us/windowsserver/dd448611.aspx, http://msdn.microsoft.com/library/cc530389(VS.85).aspx, and http://msdn.microsoft.com/en-us/library/cc542552(v=vs.85).aspx.

As mentioned earlier, Adobe LiveCycle supports a broader range of devices and operating systems which can utilize DRM protected PDF documents compared to other vendors. Microsoft Active Directory RMS supports a broader range of devices and operating systems which can utilize DRM protected Microsoft Office (Word, PowerPoint and Excel) documents compared to other vendors. Embodiments of the present invention provide a hybrid DRM system which supports all the devices and operating systems supported by multiple different types of DRM systems such as Adobe LiveCycle and Microsoft Active Directory. The system allows end users to log in to the hybrid DRM system, without having to log in to Adobe LiveCycle and Microsoft Active Directory separately, allowing for a seamless user experience. To accomplish this, mechanisms are provided to ensure that necessary information and resources, such as user information, DRM policy information and document storage infrastructure, can be shared across these multiple different DRM systems despite the fact that different existing DRM systems have their own ways and formats of storing the user, policy and storage information.

Figures 1, 3:
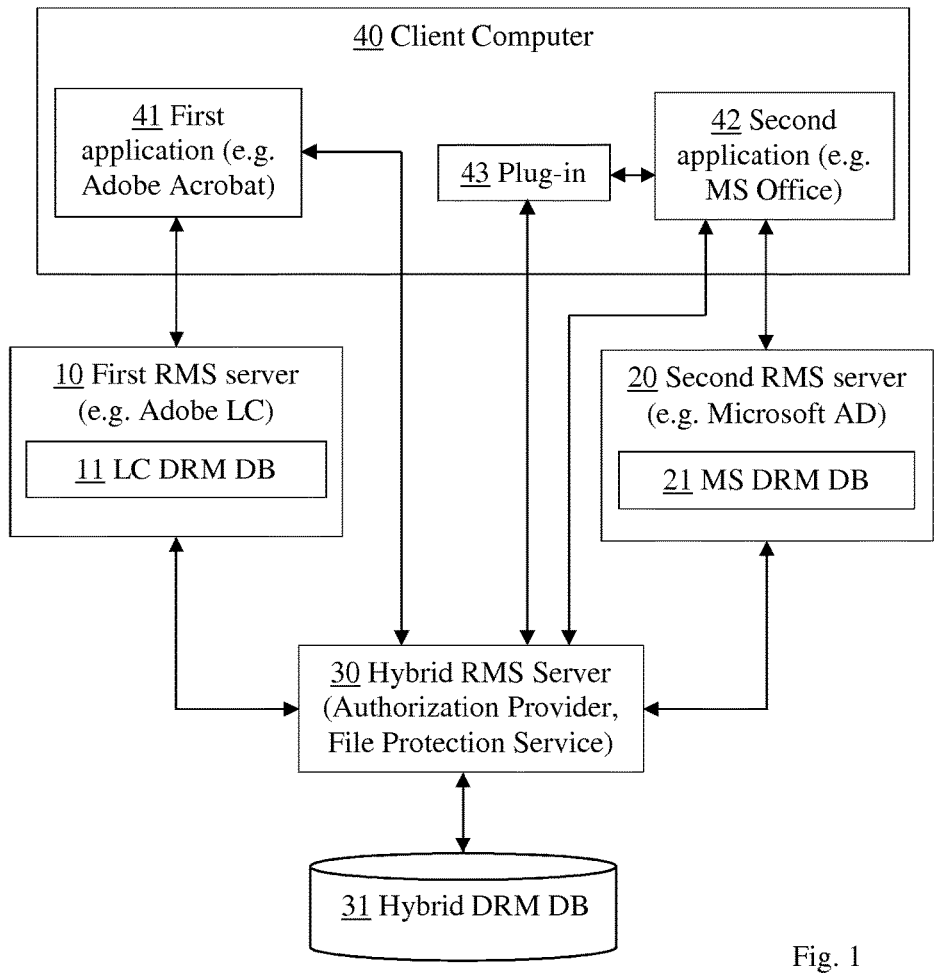
FIG. 1 schematically illustrates a DRM system that includes a hybrid RMS server which cooperates with multiple different types of DRM systems according to an embodiment of the present invention.
FIG. 3 schematically illustrates a document authentication table stored in a DRM database in the hybrid RMS server of the embodiment of FIG. 1 and used in the method of FIGS. 2A and 2B.

FIG. 1 schematically illustrates a hybrid DRM system according to various embodiments of the present invention. As shown in FIG. 1, the system includes a first RMS server 10, a second RMS server 20, a hybrid RMS server 30, and a client computer 40 connected to each other. The communication among the various components may be via a network such as the Internet. The first and second RMS servers 10 and 20 implement different types of DRM systems, such as Adobe LiveCycle ("LC") and Microsoft Active Directory ("AD") systems. The first and second RMS servers 10 and 20 maintain respective DRM databases 11 and 21 used by these RMS servers, such as LiveCycle DRM database 11 and Microsoft DRM database 21. The hybrid RMS server 30 maintains a DRM database 31 which will be described in more detail later.

The client computer 40 has a first client application 41 and a second client application 42 that interact with the first and second RMS server 10 and 20, respectively. For example, the first client application 41 may be Adobe Acrobat, and the second client application 42 may be Microsoft Word, PowerPoint, Excel, etc. The first and second client applications 41, 42 respectively cooperate with the first and second RMS servers 10, 20 to perform digital rights management in conventional ways. For example, take Adobe Acrobat as an example of the first client application 41, when the user of the client computer 10 uses the first client application to attempt to access a PDF document, the first client application transmits an authorization request the first RMS server 10 and request permission to access the PDF document. With the information provided by the first client application 41 with the authorization request, such as a user ID of the user, a document ID of the document being accessed, etc., the first RMS server 10 determines whether the requested access should be granted, and transmits an authorization response to the first client application 41, so that the first client application 41 can act accordingly to allow or deny the user access to the PDF document. The first client application 41 (e.g. Adobe Acrobat) is pre-configured to contact the first RMS server 10 (e.g. an Adobe LC server) to perform digital rights management.

The operation of Microsoft Office applications (e.g. second client application 42) is similar; here the documents the user attempts to access is a Microsoft Office document and the second client application is pre-configured to contact the second RMS server 20 (e.g. a Microsoft AD RMS server) to perform digital rights management.

Each of the Adobe LiveCycle and Microsoft Active Directory RMS systems defines its own document protection schemes. In certain circumstances the document protection schemes provided by these commercially available systems may be inflexible or insufficient to meet certain practical needs. For example, as described in commonly owned U.S. Pat. Appl. Pub. No. 2014/0282842 ("the '842 application"), in existing commercially available DRM systems which associates one rights management policy with each document being protected by the system, it is not possible to revoke the access permission granted to a particular user for a particular document without affecting that user's access rights to other documents associated with the same policy. Also, if multiple documents are associated with the same policy, and if a particular user is granted access rights under that policy, the user will have access to all of the multiple documents associated with that policy, and the DRM system cannot specifically grant that user access to some but not all of such multiple documents. The '842 application describes a method which effectively provides additional control of user access rights to documents, to allow the DRM system to more flexibly handle these types of situations as well as other situations. The type of access control accomplished by the method described in the '842 application, referred to as a "user-centric" scheme, is accomplished via a user-centric adaptor ("UCA") program module on the RMS server that cooperate with existing program modules of the commercially available DRM system.

The provision of additional access control is referred to as "policy extension" in this disclosure, i.e., it extends the rights management policy scheme provided by the existing commercially available DRM systems. The '842 application provides such policy extension for the Adobe LiveCycle system by taking advantage of the fact that LiveCycle allows for third party program modules (referred to as adaptor modules) to cooperate with LiveCycle's own program. However, currently Microsoft Active Directory RMS provides no mechanism for third party programs to cooperate with it to achieve policy extension. Thus, according to a first embodiment of the present invention, the client computer 40 is provided with a plug-in module 43 which cooperates with the hybrid RMS server 30 to accomplish policy extension for documents managed by the Microsoft Active Directory system.

Figure 2A:
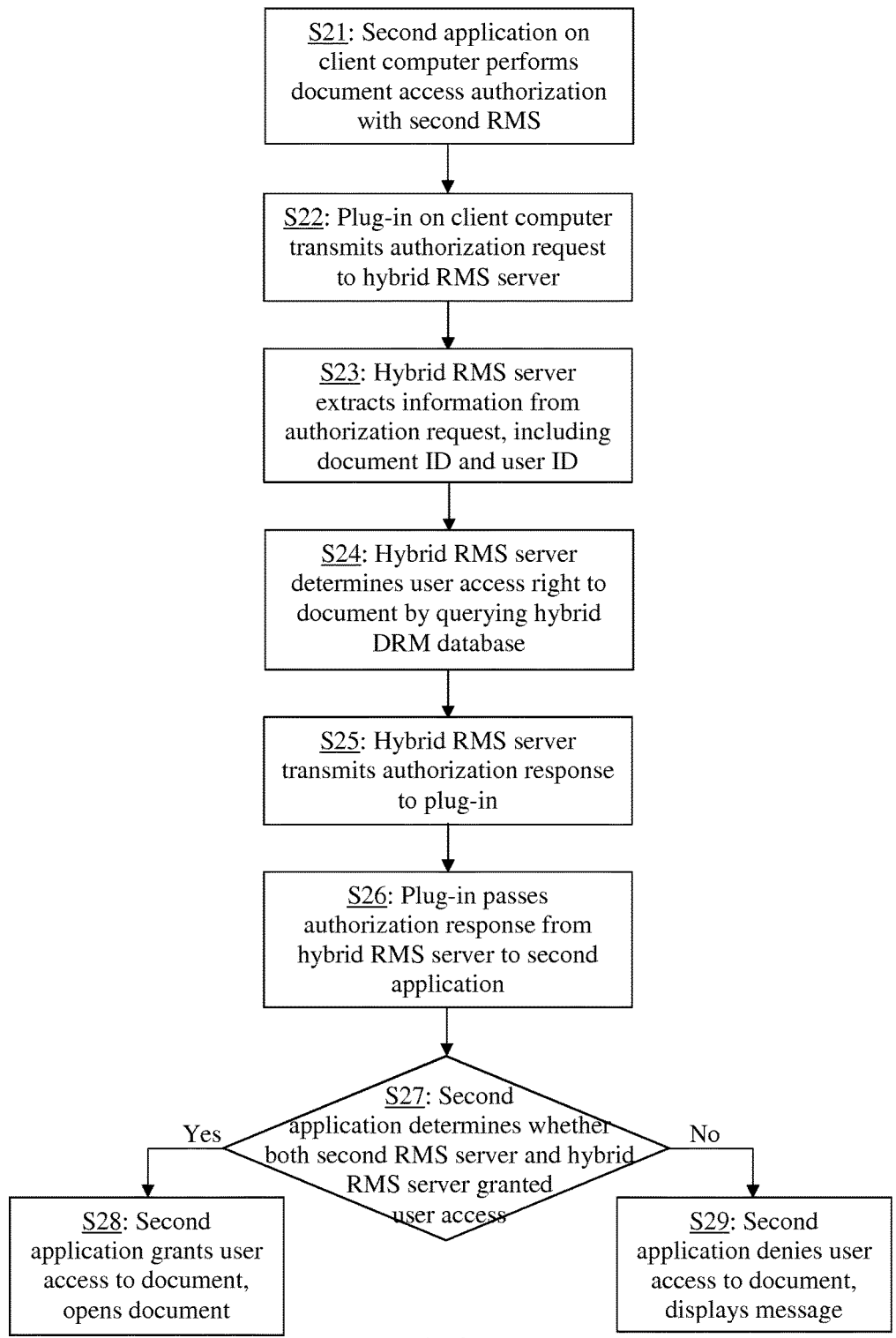
FIG. 2A schematically illustrates a document access authorization method implemented in the hybrid RMS server in the embodiment of FIG. 1.

According to the first embodiment of the present invention, the hybrid RMS server 30 provides policy extension and user-centric document access management for the Microsoft Office applications (the second client application 42) on the client 40. FIG. 2A schematically illustrates a document access authorization method according to this embodiment, which determines the user's access rights with respect to a particular document. In this process, the hybrid RMS server 30 acts as a third party authorization provider. Here, "third party" refers to a party other than the user and the Microsoft Active Directory server 20. The Microsoft Office application 42 will perform the conventional authorization process in cooperation with the Microsoft Active Directory server 20 (including obtaining a decryption key for decrypting the document), indicated at step S21 in FIG. 2A, which is not described in detail here; the authorization process described here (steps S22-S25) is in addition to the conventional authorization process.

As shown in FIG. 2A, the plug-in 43 cooperates with the Microsoft Office application 42 such that, when the user attempts to open a document using the Microsoft Office application, the plug-in transmits an authorization request to the hybrid RMS server 30 (step S22). The authorization request contains information such as a document ID of the document requested to be accessed, a user ID of the user requesting such access, etc. The document ID is a unique ID for each protected document of the hybrid DRM system. The hybrid RMS server 30 extracts information from the received authorization request, such as the document ID and the user ID (step S23), determines whether the user has access to the document by querying the DRM database 31 (step S24), and transmits a response to the plug-in 43 (step S25).

More specifically, the DRM database 31 contains policy extension and user-centric access control information, in the form of a document authorization table 32, an example of which is show in FIG. 3. Each entry of the document authorization table 32 contains a document ID ("DocumentId"), a policy associated with the document ID ("Policy"), and a status ("Status"). Each policy in the "policy" column is a binary representation of specific access permissions, i.e., which users have what kind of access permissions. The policy may be in the JSON or XML format, or other suitable formats. The document authorization table 32 associates each document ID with a policy. Note that the policies in the document authorization table 32 stored in the DRM database 31 of the hybrid RMS server 30 are not required to be the same as the policies maintained by the individual RMS servers 10 and 20 and are not subject to any constraints of such RMS systems. For example, as described above, in conventional DRM systems such as Adobe LiveCycle and Microsoft Active Directory, the number of policies is typically much smaller than the number of documents protected by the system, and many documents typically share the same policy, so when a policy is modified the access rights to all documents associated with that policy are affected. In the embodiment of the present invention, the policy for each document in the document authorization table 32 may be individually modified without affecting the access rights to any other document.

In response to the authorization request from the plug-in 43, the hybrid RMS server 30 first queries the document authorization table 32 using the document ID (DocumentId) contained in the authorization request to find the policy. Then, based on the content of the retrieved policy, the RMS server 30 determines if the user (represented by the user ID) is allowed to access the document. The status column in the document authorization table 32 shown in FIG. 3 sets a status which can be True or False. This status field can enable or disable access to the corresponding document entirely; for example, a user request to access a document will be denied, without even evaluating the corresponding policy, if the corresponding status is False. This accomplishes step S24, i.e., to determine whether the user has access right to the requested document.

Using the document authorization table 32 enables the hybrid RMS server 30 to determine the result for each authorization request internally, i.e., without referring to the Microsoft Active Directory server 20.

As mentioned earlier, the Microsoft Office application 42 performs the conventional authorization process in cooperation with the Microsoft Active Directory server 20 (step S21); the authorization process in steps S22-S25 performed by the plug-in 43 and the hybrid RMS server 30, referred to as the extended authorization process, is in addition to this conventional authorization process. Note here that the decryption key necessary to decrypt the document is managed by the second RMS server 20 and sent to the application 42 from the second RMS server in step S21 if the second RMS server grants the access; the hybrid RMS server 30 does not need to manage the decryption key, and the authorization response transmitted form the hybrid RMS server 30 to the plug-in 43 does not include a decryption key. The plug-in 43 passes the result of the extended authorization process to the second application 42 (step S26), and the second application grants or denies the user's access to the document based on both authorization responses (steps S27, S28 and S29). If either of the authorization processes returns an access denied response ("No" in step S27), the user's access to the document will be denied. Optionally, a message for "access denied" may be displayed to the user when access is denied.

Figure 2B:
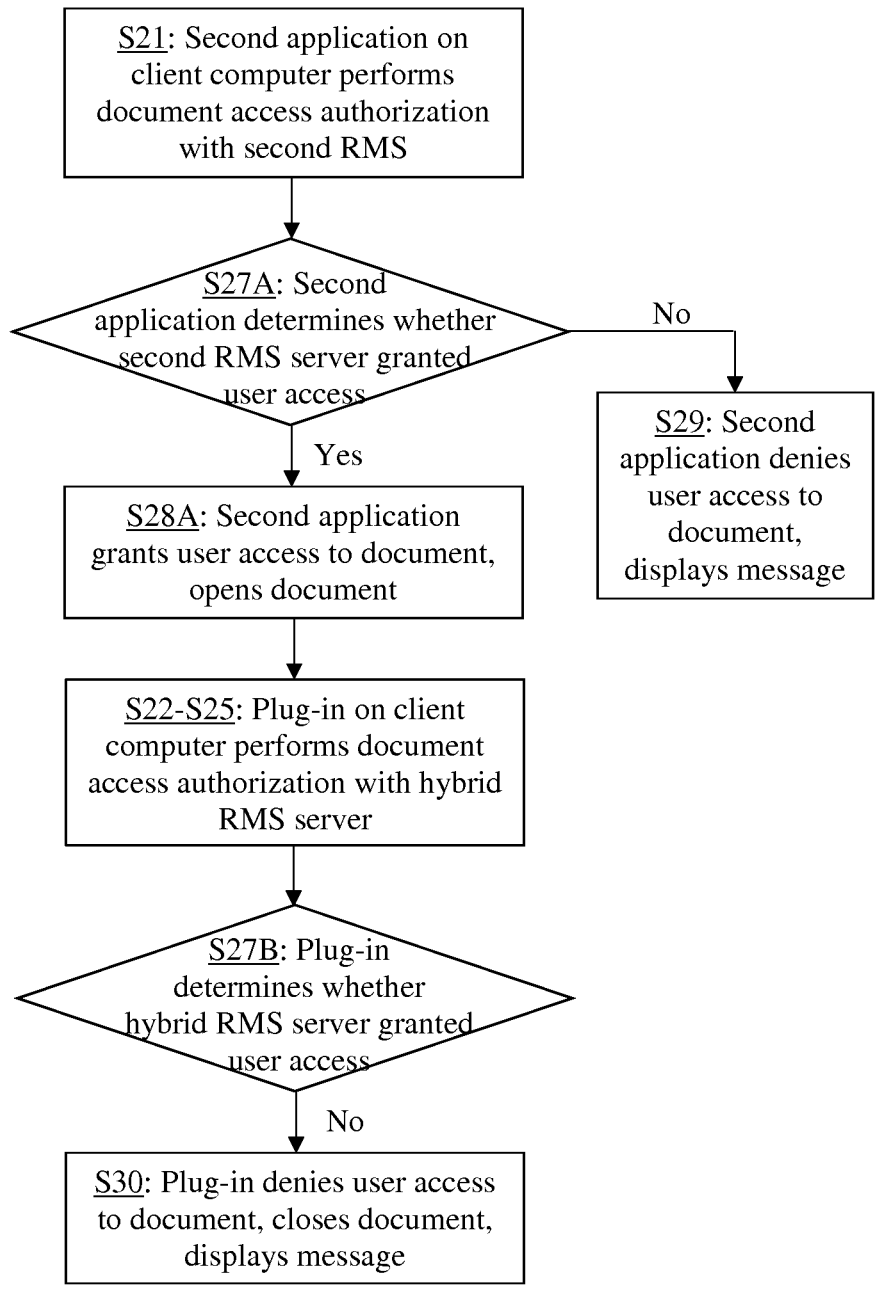
FIG. 2B schematically illustrates an alternative document access authorization method implemented in the hybrid RMS server in the embodiment of FIG. 1.

An alternative process flow for the document access authorization method is shown in FIG. 2B. Step S21 of FIG. 2B is identical to that in FIG. 2A. Then, based on the authorization response from the second RMS server (step S27A), the second application either denies the user access to the document ("No" in step S27A, step S29), or grants the user access and opens the document ("Yes" in step S27A, step S28A). Then, the plug-in performs document access authorization with the hybrid RMS server which includes steps S22 to S25 shown in FIG. 2A. The plug-in then determines whether the hybrid RMS server granted user access to the document (FIG. 27B). If it has not ("No" in step S27B), the plug-in denies user access to the document by closing the document that was opened in step S28A (step S30); otherwise, the plug-in does not perform any additional steps and therefore the document will remain open. In steps S29 and S30, a message for "access denied" may be optionally displayed to the user when access is denied. This alternative process flow achieves the same results as the process flow in FIG. 2A. Again, note here that the hybrid RMS server 30 does not need to manage the decryption key and the authorization response transmitted form the hybrid RMS server 30 to the plug-in 43 does not include a decryption key.

As mentioned earlier, currently Microsoft Active Directory RMS provides no mechanism for third party programs to cooperate with it to achieve policy extension; therefore, in the first embodiment of the present invention, the plug-in 43 on the client computer 40 is used to interact with the hybrid RMS server 30 as well as the Microsoft office application 42 to perform the extended authorization process.

In addition to the authorization process performed with the plug-in 43, the hybrid RMS server 30 also performs an extended authorization process for the first application 41 (e.g. Adobe Acrobat) to accomplish policy extension and user-centric document access control with respect to the first RMS server 10 (e.g. Adobe LiveCycle) in the manner described in the above-mentioned '842 application. The document authorization table 32 (FIG. 3) is used for the extended authorization process for both the first and second RMS servers 10 and 20. Thus, the hybrid DRM system can accomplish policy extension and user-centric document access control for all types of documents and operating system supported by both the first and second RMS servers 10 and 20.

In a second embodiment of the present invention, the hybrid DRM system provides a method for applying protection to digital documents (i.e. adding protected documents to the DRM system) such that, even though the document protection is actually performed by different RMS servers such as the first and second RMS servers 10 and 20, the hybrid RMS server 30 allows the user to interact with the hybrid RMS server regardless of the types of the document being protected or the operating system involved. This provides a unified user experience for document protection for all types of documents and all operating system supported by both the first and the second RMS servers 10 and 20. The document protection method according to the second embodiment can be implemented in the hybrid DRM system shown in FIG. 1; here the hybrid RMS server 30 acts as a document protection service.

The DRM database 31 on the hybrid RMS server 30 contains an RMS server information table 33, an example of which is shown in FIG. 5, which lists the different types of RMS servers supported in the hybrid DRM system. Each entry of the RMS server information table 33 is for an RMS server supported in the hybrid system, such as RMS servers 10 or 20, and includes the following information: (1) an RMS server ID ("RMSRefId"), which is a unique ID in the hybrid DRM system; (2) a policy schema ("PolicySchema") of this RMS server, which defines the format of the DRM policies used by the RMS server; (3) endpoint information ("Binding") for this RMS server, such as the server address (e.g. an URL or IP address), the administrative user's username and password, etc., which is necessary to access the server; (4) a set of filename extensions for documents supported by this RMS server ("SupportedFiles"); and (5) a status ("Status"), which may be set to True or False.

The DRM database 31 on the hybrid RMS server 30 also contains a policy table 34, an example of which is shown in FIG. 6, which stores full policy information for each policy supported by the hybrid RMS server 30. Each entry of the policy table 34 corresponds to a policy, identified by a policy ID ("PolicyRefId"), and contains a binary representation of full information about the policy ("Policy")—i.e., which users have what type of access rights under this policy. The policy table also contains a status for each policy ("Status"). The full policy information is in a binary format internally recognized by the hybrid RMS server 30, and can be used to generate DRM policies of other formats recognized by the first or second RMS servers 10 and 20, as will be described later.

In addition, the DRM database 31 on the hybrid RMS server 30 contains a policy mapping table 35, an example of which is shown in FIG. 7, which maps DRM policies across different RMS servers 10, 20 and 30. As mentioned earlier, the first and second RMS servers 10, 20 have their own DRM policies stored in the DRM databases 11, 21 respectively. The policy mapping table 35 maps the policies it maintains (e.g. see FIG. 6) to policies on the first or second RMS servers 10 and 20. As shown in FIG. 7, each mapping is identified by an ID ("Id"), and maps one policy of the hybrid RMS server 30 ("PolicyRefId") to one policy ("RemotePolicyRefId") on one other RMS server ("RMSRefId"). For example, in the first row in FIG. 7, the policy ID P0 on the hybrid RMS server 30 is mapped to policy ID A0 on the RMS server R0 (e.g. server 10), and in the third row, the same policy ID P0 on the hybrid RMS server 30 is mapped to policy ID M0 on the RMS server R1 (e.g. server 20). The identifier ("Id") in the policy mapping table 35 is an internal ID that identifies each mapping. Note that some policies on the hybrid RMS server 30 may not map to any policy on another RMS server. The policies on different RMS servers that are mapped to one another have identical policy content, i.e., identical in their definitions of which users have what types of access rights under that policy, although they will typically have different formats.

Figure 4:
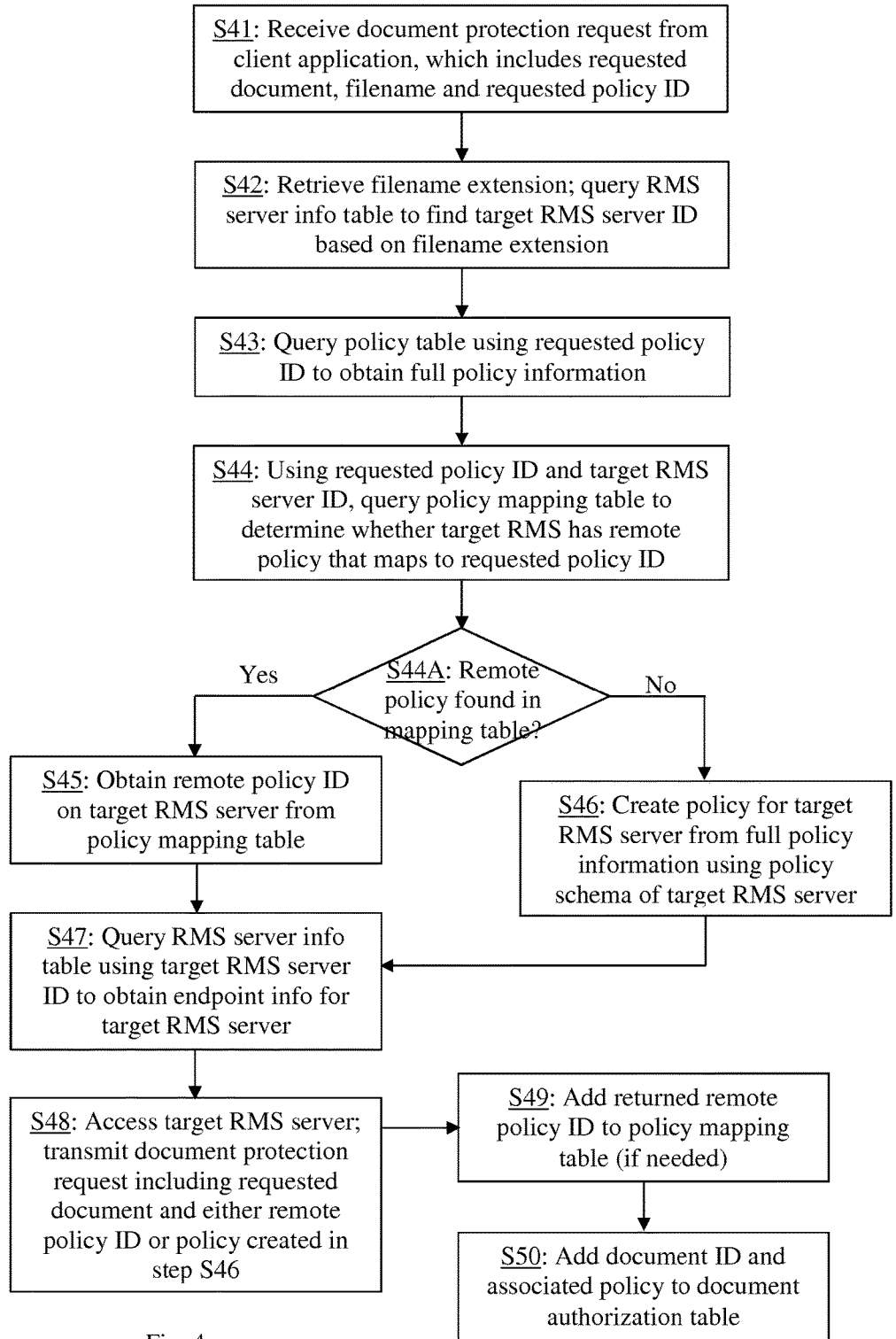
FIG. 4 schematically illustrates a document protection method implemented in the hybrid RMS server in the embodiment of FIG. 1.

FIG. 4 schematically illustrates a method implemented on the hybrid RMS server 30 for adding protected documents to the hybrid DRM system. To protect a document, the client application, which may be either the first application 41 or the second application 42, calls the hybrid RMS server 30 (the document protection service). The client application 41 or 42 has been configured (e.g. when the applications were installed) to call the hybrid RMS server 30 instead of the first or second RMS server 10 or 20. The client application 41 or 42 transmits a document protection request to the hybrid RMS server 30, which includes the document to be protected (referred to as the requested document), the filename of the document, and a reference of a DRM policy (e.g. a policy ID) to be used to protect the document (referred to as the requested policy ID). Note that the policy ID is the policy ID defined on the hybrid RMS server 30, not the policy ID used by the individual RMS servers 10 or 20.

Upon receiving the document protection request (step S41), the hybrid RMS server 30 retrieves the filename extension from the input filename, e.g. .pdf for Adobe PDF document, .doc for Microsoft Word document, etc., and using the filename extension, queries the RMS server information table 33 (FIG. 5) to find at least one RMS server that supports the input filename extension (referred to as the target RMS server) (step S42). The hybrid RMS 30 also queries the policy table 34, using the requested policy ID, to obtain full information about that policy (step S43).

Then, using the requested policy ID and the target RMS server found in step S42, the hybrid RMS server 30 queries the policy mapping table 35 to determine whether the target RMS has a policy (referred to as a remote policy) that maps to the requested policy ID (step S44). If such a remote policy is found in the policy mapping table 35 ("Yes" in step S44A), the corresponding remote policy ID ("RemotePolicyRefId") for the target RMS server is obtained from the table (step S45).

If, on the other hand, there is no remote policy on the target RMS server that maps to the requested policy ID ("No" in step S43A), the hybrid RMS server 30 creates a remote policy for the target RMS server from the full information about the policy obtained in step S43, using the policy schema of that RMS server (step S46). Note that because the policy schema defined by each target RMS server has its own requirements of what types of policy terms can be accommodated in its policies, it is often the case that not all parts of the full policy information in the policy of the hybrid server will be used to create the policies for the target RMS. The parts of the full policy information that is not included in the created policy for the target RMS server correspond to the policy extension referred to above.

The hybrid RMS server 30 then queries the RMS server information table 33 using the target RMS server ID ("RMSRefId") to obtains the endpoint information ("Binding") for the target RMS server (step S47). The hybrid RMS server 30 then accesses the target RMS server 10 or 20 using the endpoint information, and transmits a document protection request to the target RMS server (step S48). The document protection request includes the requested document, a document ID for the document, and either the remote policy ID on the target RMS server obtained in step S45 or the policy created in step S46. The document ID is generated by the hybrid RMS server, which ensures that the document IDs for documents protected by the hybrid DRM system are globally unique regardless of which target RMS server processes each document.

In response to the document protection request, the target RMS server 10 or 20 protects the document using its existing document protection process. This may include, by the target RMS server, encrypting the document, storing the encryption key, associating the document with the policy, etc. Note that if a corresponding remote policy was not found in step S44 and the hybrid RMS server 30 created a policy in step S46 and transmitted it to the target RMS server 10 or 20 in step S48, the target RMS server assigns a policy ID to that policy and stores it in its own DRM database 11 or 21, and associates it with the document being protected. The target RMS server also returns the policy ID assigned by the target RMS server (the remote policy ID), and the hybrid RMS server 30 stores the remote policy ID in the policy mapping table 35 by mapping it to the policy that was used to create that remote policy in steps S46 (step S49).

The hybrid RMS server 30 also adds the document to be protected to its document authorization table 32, which associates the document ID with full policy information of the requested policy used to protect it (step S50). Note that his step can be performed at any point after the full policy information is obtained (i.e. step S43).

Note here that because the encryption keys for encrypting the documents are stored and managed by the target RMS server 10 or 20, the hybrid RMS server 30 does not need to store or manage the encryption keys.

It can be seen that the second embodiment of the present invention provides document protection using a single RMS server (the hybrid RMS server 30), so there is no need for the user to remember which server to connect to for which document type. This method is made possible by using policy conversion to convert DRM policies to different schemas required by different RMS servers. Under conventional systems, a user has to connect to different individual RMS servers to protect different types of documents such as PDF and Microsoft Word documents.

In a third embodiment of the present invention, the hybrid DRM system provides a method for authenticating users onto the RMS system so that the user only needs to login to a single RMS server, namely the hybrid RMS server 30, to perform all DRM functions even though some of these functions are handled by the individual RMS servers such as the first and second RMS servers 10 and 20. The user authentication method according to the third embodiment can be implemented in the hybrid RMS system shown in FIG. 1; here the hybrid RMS server 30 acts as a unified authentication provider.

The DRM database 31 on the hybrid RMS server 30 stores a domain authentication provider table 36, an example of which is shown in FIG. 9, which lists the RMS servers (domain authentication providers) that are registered with the hybrid RMS system. Each entry of the domain authentication provider table 36 contains an ID of the RMS server ("DomainId"), the type of the RMS server such as Adobe LiveCycle or Microsoft Azure RMS ("Name"), and the endpoint information of the RMS server ("Binding"). As mentioned earlier, endpoint information (binding) is a binary representation of information regarding the RMS server, including the server address (e.g. an URL or IP address), the administrative user's username and password, etc., which is necessary to access the server. Note here that the RMS server ID ("DomainId") in the domain authentication provider table 36 may be the same as the RMS server ID ("RMSRefId") in the RMS server table 33 and the policy mapping table 35, if the same RMS server (e.g. RMS server 10 or 20) acts both as the document protection service and as the domain authentication provider; or they may be different if different servers provide these two services.

The DRM database 31 also stores a shallow user table 37, an example of which is shown in FIG. 10. The user table is "shallow" in that it does not contain sensitive information such as the user's password or its hash. Each entry of the user table 37 is identified by an internal ID ("Id"), and stores a user ID ("UserId") which includes a domain name part, the ID of the RMS server on which the user is registered ("DomainId"), and a status ("Status") which indicates whether the user is allowed to authenticate through the hybrid DRM system. The RMS server ID ("DomainId") in this table is the same parameter as the RMS server ID in the domain authentication provider table 36. The entries of the shallow user table 37 are created when individual RMS servers (e.g. servers 10, 20) are registered as a part of the hybrid DRM system, where the user IDs—for users who have previously registered with the respective individual RMS servers—are provided by the individual RMS servers and collected by the hybrid RMS server 30 into the shallow user table 37. Note that a part of the user ID, e.g. the @xxx.com and @yyy.com parts in the examples shown in FIG. 10, is an indication of the individual RMS server which the user is originally registered with.

Figure 8:
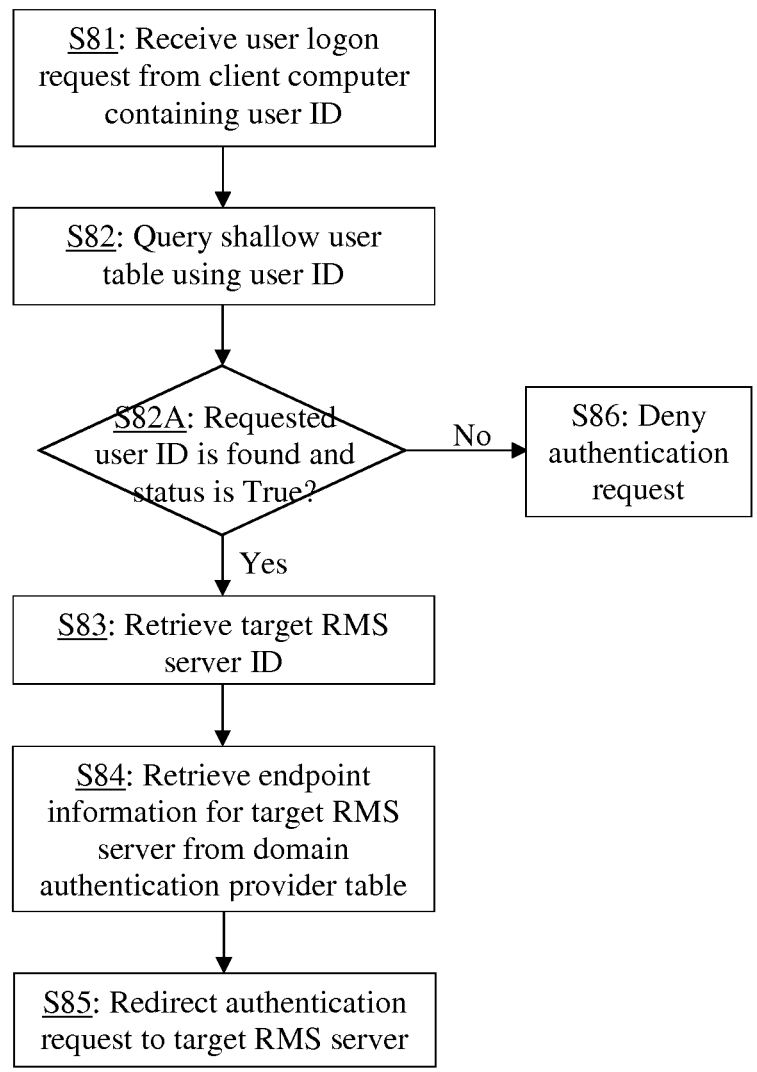
FIG. 8 schematically illustrates a user authentication method implemented in the hybrid RMS server in the embodiment of FIG. 1.

FIG. 8 illustrates a method implemented on the hybrid RMS server 30 for authenticating a user to the hybrid DRM system. Upon receiving a user logon request from the client computer 40 containing a user ID of the requesting user (the requested user ID) (step S81), the hybrid RMS server 30 queries the shallow user table 37 using the user ID (step S82). If the user table contains the requested user ID and the corresponding status for that user indicates that the user is allowed to authenticate through the hybrid DRM system ("Yes" in step S82A), the hybrid RMS server 30 retrieves the ID of the target RMS server ID ("DomainId") from the user table (step S83). Then, using the target RMS server ID ("DomainId"), the hybrid RMS server 30 retrieves the endpoint information ("Binding") for the target RMS server from the domain authentication provider table 36 (step S84). Using the endpoint information, the hybrid RMS server 30 accesses the target RMS server and redirects the user's logon request to that server (step S85). In step S82A, if the user ID is not found in the shallow user table 37 or if the corresponding status is "False" indicating that the user is not allowed to authenticate through the hybrid DRM system ("No" in step S82A), the user's logon request is denied without redirection (step S86). This way, the user's request can be denied even if the individual authentication provider might have authenticated this user. This allows for more flexible control of user authentication.

It should be noted that in the three embodiments, namely document access authorization (FIG. 2), document protection (FIG. 4), and user authentication (FIG. 8), the hybrid RMS server 30 that performs these processes may be the same physical server (as depicted in FIG. 1), or they may be different servers performing the respective functions. If they are different servers, they may share the same hybrid DRM database 31 or maintain duplicate DRM databases.

It can be seen that in the hybrid DRM system described above, the same policy information used for protecting different types of documents like PDF, Word, PowerPoint, Excel, the same user information is used for protecting different documents, and the same storage infrastructure is used for storing all documents. Once user logs in the system, it will be transparent to him and he will feel that he is working with one RMS system, though in the background we will be processing the requests using multiple RMS systems.

It will be apparent to those skilled in the art that various modification and variations can be made in the digital rights management method and related apparatus of the present invention without departing from the spirit or scope of the invention. Thus, it is intended that the present invention cover modifications and variations that come within the scope of the appended claims and their equivalents.

What is claimed is:

1. A digital rights management method implemented in a system including a first digital rights management server (first RMS server), a second digital rights management server (second RMS server), and a client computer connected to the first RMS server and the second RMS server, the client computer including an application program for interacting with a document which is requested to be accessed by a user and a plug-in program which cooperates with the application program, the method comprising:

(a) the application program communicating with the first RMS server to obtain a first authorization response which indicates whether the first RMS server grants or denies access to the document by the user under a first digital rights management policy (first DRM policy) stored on the first RMS server;

(b) the plug-in program communicating with the second RMS server to obtain a second authorization response which indicates whether the second RMS server grants or denies access to the document by the user under a second digital rights management policy (second DRM policy) stored on the second RMS server, wherein the second RMS server is a separate and different server from the first RMS server, and wherein the second DRM policy contains additional policy terms not contained in the first DRM policy; and (c) the plug-in program and the application program cooperating with each other to grant or deny access to the document by the user based on the first authorization response which has been obtained from the first RMS server and the second authorization response which has been obtained from the second RMS server, wherein the plug-in program and the application program grant access to the document by the user only if the first authorization response indicates that the first RMS server grants access to the document by the user and the second authorization response indicate that the second RMS server grants access to the document by the user.

2. The method of claim 1, wherein the second RMS server stores a document authorization table, the document authorization table containing a plurality of document IDs and a DRM policy associated with each document ID including full policy information regarding which users have what access rights to a document represented by the document ID, wherein step (b) includes:

the plug-in program transmitting an authorization request to the second RMS server, the authorization request including a document ID of the document requested to be accessed and a user ID of the user requesting the access;

the second RMS server extracting the document ID and the user ID from the authorization request received from the plug-in program;

the second RMS server querying the document authorization table using the document ID to obtain the full policy information associated with the document ID, and based on the full policy information, determining whether the user is to be granted or denied access to the document; and the second RMS server transmitting the authorization response to indicate whether the user is granted or denied access to the document.

3. The method of claim 1, wherein the second RMS server stores a document authorization table, the document authorization table storing a plurality of document IDs and a DRM policy associated with each document ID including full policy information regarding which users have what access rights to the document, the document authorization table further including a status associated with each document ID, wherein step (b) includes:

the plug-in program transmitting an authorization request to the second RMS server, the authorization request including a document ID of the document requested to be accessed and a user ID of the user requesting access;

the second RMS server extracting the document ID and the user ID from the authorization request received from the plug-in program;

the second RMS server querying the document authorization table using the document ID to first determine whether the associated status is a first value, and if it is, to obtain the associated full policy information, and based on the full policy information, determining whether the user is to be granted or denied access to the document; and the second RMS server transmitting the authorization response to indicate whether the user is granted or denied access to the document.

4. The method of claim 1, wherein the second RMS server is a Microsoft Active Directory RMS server and the application program is a Microsoft Office program.

5. The method of claim 1, wherein step (c) includes:
after step (b), the plug-in program passing the second authorization response to the application program; and
the application program granting or denying access to the document by the user based on the first authorization response received from the first RMS server and the second authorization response received from the plug-in program.

6. A digital rights management method implemented in a system including a first digital rights management server (first RMS server), a second digital rights management server (second RMS server), and a client computer connected to the first RMS server and the second RMS server, the client computer including an application program for interacting with a document which is requested to be accessed by a user and a plug-in program which cooperates with the application program, the method comprising:

(a) the application program communicating with the first RMS server to obtain a first authorization response which indicates whether the first RMS server grants or denies access to the document by the user under a first digital rights management policy (first DRM policy) stored on the first RMS server, wherein when the first authorization response indicates that the first RMS server grants access to the document, the first authorization response further includes a decryption key for decrypting the document, and (b) the plug-in program communicating with the second RMS server to obtain a second authorization response which indicates whether the second RMS server grants or denies access to the document by the user under a second digital rights management policy (second DRM policy) stored on the second RMS server, wherein the second authorization response includes no decryption key regardless of whether the second RMS server grants or denies access to the document, wherein the second RMS server is a separate and different server from the first RMS server, and wherein the second DRM policy contains additional policy terms not contained in the first DRM policy; and (c) the plug-in program and the application program cooperating with each other to grant or deny access to the document by the user based on the first authorization response which has been obtained from the first RMS server and the second authorization response which has been obtained from the second RMS server, wherein the plug-in program and the application program grant access to the document by the user only if the first authorization response indicates that the first RMS server grants access to the document by the user and the second authorization response indicate that the second RMS server grants access to the document by the user.

7. The method of claim 6, wherein the second RMS server stores a document authorization table, the document authorization table containing a plurality of document IDs and a DRM policy associated with each document ID including full policy information regarding which users have what access rights to a document represented by the document ID, wherein step (b) includes:
the plug-in program transmitting an authorization request to the second RMS server, the authorization request including a document ID of the document requested to be accessed and a user ID of the user requesting the access;
the second RMS server extracting the document ID and the user ID from the authorization request received from the plug-in program;
the second RMS server querying the document authorization table using the document ID to obtain the full policy information associated with the document ID, and based on the full policy information, determining whether the user is to be granted or denied access to the document; and
the second RMS server transmitting the authorization response to indicate whether the user is granted or denied access to the document.

8. The method of claim 6, wherein the second RMS server stores a document authorization table, the document authorization table storing a plurality of document IDs and a DRM policy associated with each document ID including full policy information regarding which users have what access rights to the document, the document authorization table further including a status associated with each document ID,
wherein step (b) includes:
the plug-in program transmitting an authorization request to the second RMS server, the authorization request including a document ID of the document requested to be accessed and a user ID of the user requesting access;
the second RMS server extracting the document ID and the user ID from the authorization request received from the plug-in program;
the second RMS server querying the document authorization table using the document ID to first determine whether the associated status is a first value, and if it is, to obtain the associated full policy information, and based on the full policy information, determining whether the user is to be granted or denied access to the document; and
the second RMS server transmitting the authorization response to indicate whether the user is granted or denied access to the document.

9. The method of claim 6, wherein the second RMS server is a Microsoft Active Directory RMS server and the application program is a Microsoft Office program.

10. The method of claim 6, wherein step (c) includes:
after step (b), the plug-in program passing the second authorization response to the application program; and
the application program granting or denying access to the document by the user based on the first authorization response received from the first RMS server and the second authorization response received from the plug-in program.

11. A digital rights management method implemented in a system including a first digital rights management server (first RMS server), a second digital rights management server (second RMS server), and a client computer connected to the first RMS server and the second RMS server, the client computer including an application program for interacting with a document which is requested to be accessed by a user and a plug-in program which cooperates with the application program, the method comprising:
(a) the application program communicating with the first RMS server to obtain a first authorization response which indicates whether the first RMS server grants or denies access to the document by the user under a first digital rights management policy (first DRM policy) stored on the first RMS server;
(b) the plug-in program communicating with the second RMS server to obtain a second authorization response which indicates whether the second RMS server grants or denies access to the document by the user under a second digital rights management policy (second DRM policy) stored on the second RMS server, wherein the second DRM policy contains additional policy terms not contained in the first DRM policy; and
(c) the plug-in program and the application program cooperating with each other to grant or deny access to the document by the user based on the first authorization response and the second authorization response,
wherein step (c) includes:
after step (a) and before step (b), the application program opening the document if the first authorization response indicates that the first RMS server grants access to the document by the user, and otherwise denies access to the document;
wherein step (b) is performed after the step of opening the document; and
after step (b), if the second authorization response indicates that the second RMS server denies access to the document by the user, the plug-in program closes the document that was opened by the application program.

12. The method of claim 11, wherein the second RMS server stores a document authorization table, the document authorization table containing a plurality of document IDs and a DRM policy associated with each document ID including full policy information regarding which users have what access rights to a document represented by the document ID,
wherein step (b) includes:
the plug-in program transmitting an authorization request to the second RMS server, the authorization request including a document ID of the document requested to be accessed and a user ID of the user requesting the access;
the second RMS server extracting the document ID and the user ID from the authorization request received from the plug-in program;
the second RMS server querying the document authorization table using the document ID to obtain the full policy information associated with the document ID, and based on the full policy information, determining whether the user is to be granted or denied access to the document; and
the second RMS server transmitting the authorization response to indicate whether the user is granted or denied access to the document.

13. The method of claim 11, wherein the second RMS server stores a document authorization table, the document authorization table storing a plurality of document IDs and a DRM policy associated with each document ID including full policy information regarding which users have what access rights to the document, the document authorization table further including a status associated with each document ID,
wherein step (b) includes:
the plug-in program transmitting an authorization request to the second RMS server, the authorization request including a document ID of the document requested to be accessed and a user ID of the user requesting access;
the second RMS server extracting the document ID and the user ID from the authorization request received from the plug-in program;

the second RMS server querying the document authorization table using the document ID to first determine whether the associated status is a first value, and if it is, to obtain the associated full policy information, and based on the full policy information, determining whether the user is to be granted or denied access to the document; and the second RMS server transmitting the authorization response to indicate whether the user is granted or denied access to the document.

14. The method of claim 11, wherein the second RMS server is a Microsoft Active Directory RMS server and the application program is a Microsoft Office program.

* * * * *